March 22, 1966  R. E. LAUTTERBACH  3,241,787
LINE PICKUP GUIDE MEANS FOR A SPINNING REEL
Filed Sept. 11, 1962  2 Sheets-Sheet 1

*INVENTOR.*
RICHARD ERNEST LAUTERBACH
BY John P. Murphy
ATTORNEY

March 22, 1966 R. E. LAUTTERBACH 3,241,787
LINE PICKUP GUIDE MEANS FOR A SPINNING REEL
Filed Sept. 11, 1962 2 Sheets-Sheet 2
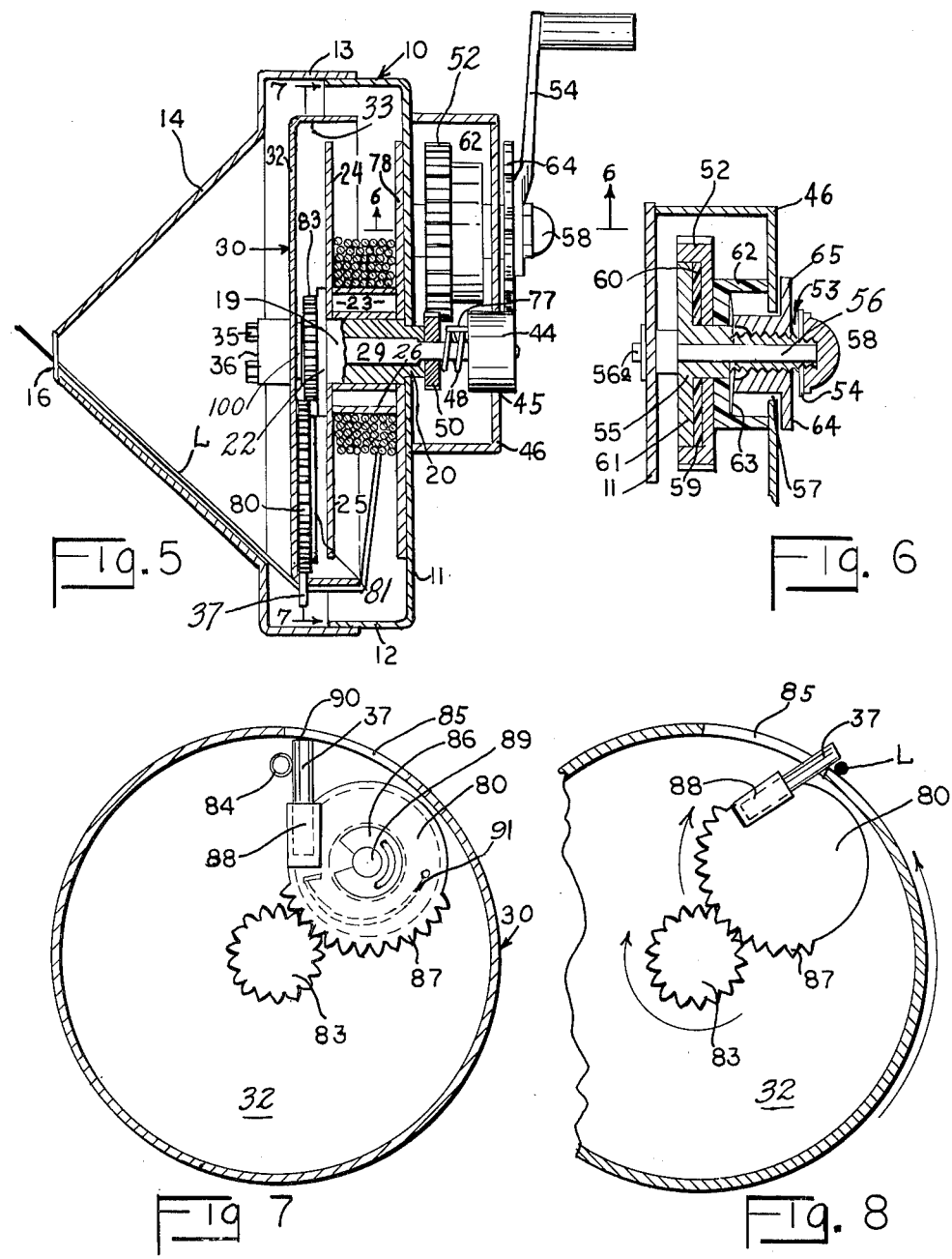
INVENTOR.
RICHARD ERNEST LAUTERBACH
BY John P. Murphy
ATTORNEY

United States Patent Office 3,241,787
Patented Mar. 22, 1966

3,241,787
LINE PICKUP GUIDE MEANS FOR A
SPINNING REEL
Richard Ernest Lauterbach, 1913 Baker Ave., Utica, N.Y.
Filed Sept. 11, 1962, Ser. No. 222,902
4 Claims. (Cl. 242—84.2)

This invention relates generally to fishing reels of the spinning variety, and more particularly to the pickup and actuating means for the pickup.

Accordingly it is the main object of this invention to provide a spinning reel with an improved pickup that is efficient and actuated by positive means.

It is a further object to provide a pickup and actuating means that sustains very little wear while subjected to service.

Also it is an important object of this invention to provide a spinning reel with a pickup and actuating means that is inexpensive to produce.

These and other more detailed and specific objects will be disclosed in the course of the following specification, reference being had to the accompanying drawings in which:

FIG. 5 is a diametrical section through the reel on an enlarged scale.

FIG. 6 is a detail view through the drag mechanism as viewed substantially along the line 6—6 in FIG. 5.

FIG. 7 is an enlarged partial sectional view taken along line 7—7 in FIG. 5 of the spooling member, showing a more detailed view of the pick-up means.

FIG. 8 is a fragmentary partial sectional view of the spooling member similar to FIG. 7 but depicting the pick-up mechanism in functioning position.

Figure 1:
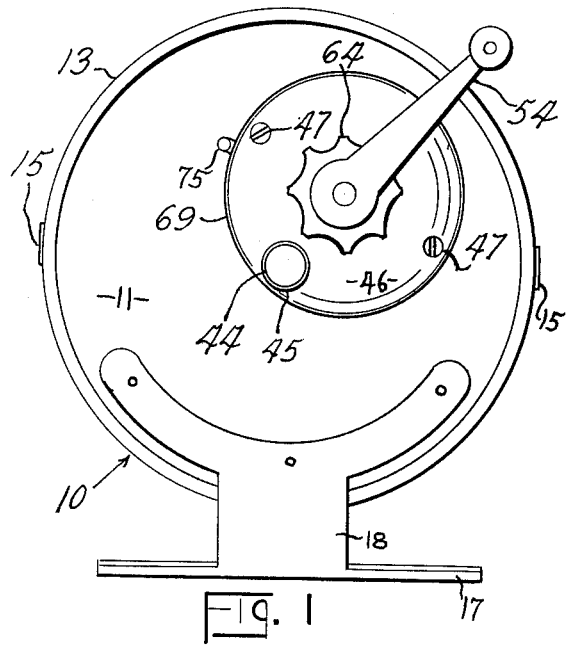
FIG. 1 is a side elevation of our improved spinning reel as taken from the side carrying the gear case, crank, star drag, etc.
Figure 2:
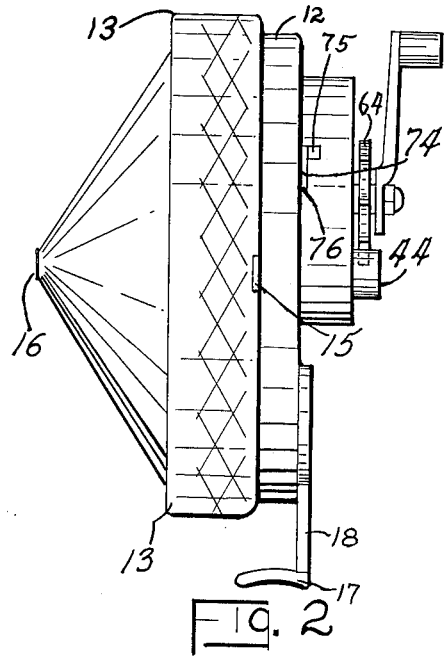
FIG. 2 is an edge view of the reel.
Figure 3:
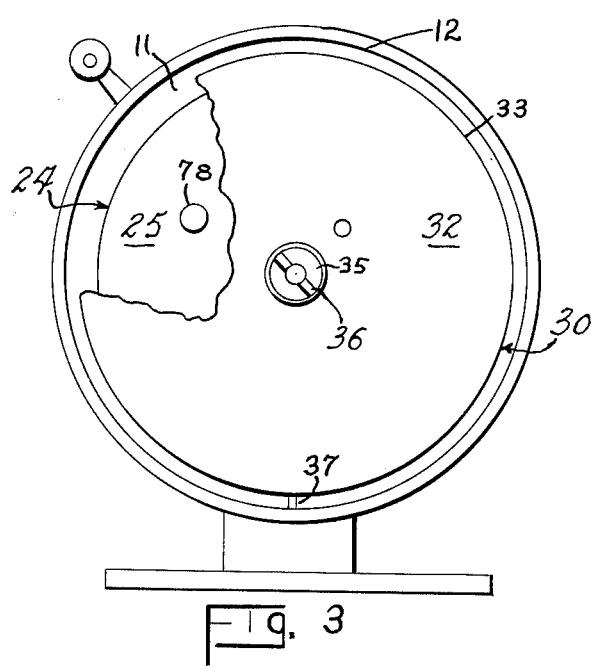
FIG. 3 is an elevational view from the side opposite that viewed in FIG. 1 with the reel cover removed, to disclose the interior of the reel. In this view, the spooling member is partially broken away to show the line spool.

Referring now more particularly and by reference characters to the drawing, my present reel includes a frame or case, designated generally at 10, made up of a circular end plate 11 having marginal flanges 12 upon which is fitted the flange 13 of a cover 14 to complete an enclosure for the spool and related parts of the reel. The flange 13 is formed with ordinary bayonet-like locking grooves at the points 15 for engagement with slight projections upon the flanges 12 so that the cover may be locked in place, or unlocked, by rotating it slightly in opposite directions with reference to the case 10. The cover 14 is provided at its center with a bearing eyelet 16 out through which the fishing line L will be directed, as seen in FIG. 5. For mounting the reel upon the ordinary fishing rod the reel is provided with a mounting tang 17 from which there is turned a laterally disposed flange 18 riveted or otherwise suitably secured to the end plate 11. Also forming part of this frame structure is a centrally located, stationary bearing 19 and the same in this instance is press fitted or otherwise permanently mounted in an opening 20 provided for its reception in the end plate 11. The bearing itself is tubular, for the slidable and rotatable accommodation of a spooling member drive shaft as will presently appear.

The fishing line L is wound upon the cylindrical core 23 of a line spool, designated generally at 24, having opposed spool ends 25 of circular shape to thereby provide an annular space for accommodation of the necessary amount of line. The end plates 25 are provided centrally with openings through which there projects and is secured a tubular spool hub 26 adapted to nicely slip upon the bearing 19 with one of the end plates 25 in contact with the inner surface of the end plate 11 of the reel case, as clearly shown in FIG. 5.

Figure 4:
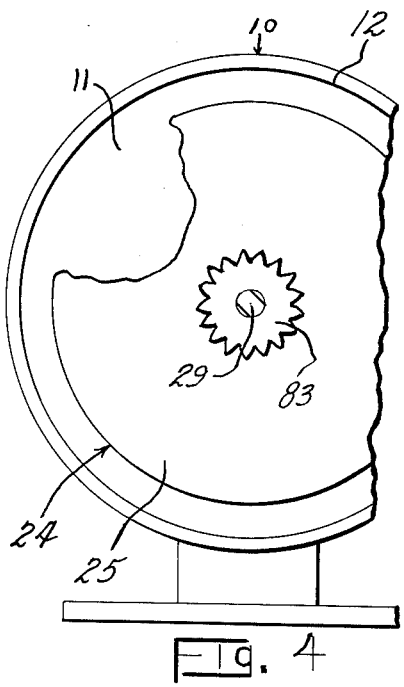
FIG. 4 is a view similar to FIG. 3 but with the spooling member entirely removed, showing the actuating gear in position.

The bearing 19 also rotatably and axially, slidably supports the drive shaft 29, the inner end of which projects beyond the end of the bearing for mounting and operating a spooling member 30. For this purpose this end of the drive shaft 29 is reduced, threaded and provided with opposed flats, as seen to best advantage in FIG. 4, in order to non-rotatably engage a correspondingly shaped center opening in the spooling member. The spooling member 30 includes a circular end plate 32 of larger diameter than the reel spool 24 and provided with a flange 33 turned toward the spool and projecting beyond the adjacent end plate 25 thereof. Thus the fishing line L, as it travels between the spool and the bearing eyelet 16, must pass over the flange 33 of the spooling member and for obvious reasons the edge of said flange is made very smooth. A retaining nut 35 is screwed upon the extremity of the shaft 29 and to facilitate its operation this nut is both knurled and provided with the usual wide kerfs 36 so that the nut may be turned up tight or loosened by the use of a coin. Obviously when the nut 35 is turned up tightly the spooling member 30 is anchored to the shaft 29 to rotate therewith and, as will presently appear, such rotation of the shaft is accomplished by the usual crank with which most reels are provided in order to spool the line upon the spool 24.

The spooling of the line is accomplished by a pick-up pin or spooling member 37 which normally projects radially through the flange 33 of the spooling member 30 adjacent the point at which said flange merges with the center plate 32. In the present instance the pin 37 is of an especially hard and smooth metal resistant to line wear. The pin 37 is press fitted into a carrier 88 which is permanently attached to the actuating gear 80. Actuating gear 80 is axially slidably mounted upon an axle 89 which is permanently secured to the back of the spooling member 32. A spring clip 86 maintains the position of the actuating gear 80 on axle 89 as seen in FIG. 7. When pin 37 is in nonfunctioning position as seen in FIG. 7, said pin rests against a stop 84 with the face 90 of the pin 37 disposed either flush with the outside surface of the spooling member 30 or somewhat behind the surface as clearly seen in FIG. 7. A hairspring 91, one end attached to spooling member 30 and other end attached to actuating gear 80, is under some slight tension which is sufficient to maintain pin 37 against stop 84 when actuation of the pin 37 is not desired.

When pickup of the line L is desired, rotation of crank arm 54 effects movement through gears 52, 50 and finally to gear 83 which is somewhat slidably mounted upon bearing 19.

In the first stage of actuation, spooling member 30 is rotated through a specified number of degrees of arc. It is seen that spooling member 30 is readily and completely affixed to axial member 29 when in assembled form, but can be readily removed for changing of line, etc., as hereinabove described. Under rotation of spooling member 30, actuating member 80, which is connected to gear 83 by gear teeth 87, rotates through a specified number of degrees to thence be positioned as seen in FIG. 8. Under rotation of actuating member 80, pin 37 moves through slit 85 to then be exposed as clearly seen in FIG. 8. In this exposed condition, pin 37 is in position to capture line L which under subsequent rotation is wound on spool 24 as seen in FIG. 5.

As seen in FIG. 8, rotation of actuating gear 80 is limited by the slit 85, or some other effective stop. Under further rotation of spooling member 30, gear 83 must remain stationary in relation to member 30 and hence rotate about bearing 19. As it appears from FIG. 5. Gear 33 is disposed on bearing 19 with a surface in frictional engagement with friction disk 22. Gear 83 is held under a specified tension against disk 22 by nut 35 acting upon outer plate 32 and washer 100. When torque above a specified threshold is applied to spooling member 30 (this torque being in turn applied to gear 33) it causes the frictional bond between gear 33 and disk 22 to be broken and gear 33 to frictionally rotate about bearing 19. The rotation of gear 83 allows spooling member 30 to rotate and thus wind line L upon the spool 24. This rotation also maintains pin 37 in its working position such that pickup of line L is effected.

When casting of line L is desired, the pin 37 must withdraw from its exposed pick-up position. This is accomplished in the following manner: Winding of gear arm 54 is stopped which substantially stops travel of spooling member 30. Control button 44 is pressed projecting shaft 29 inwardly (to the left as viewed in FIG. 5) and thus forcing spooling member 30 and attached actuating member 80 inwardly. Hence actuating member 80 is disengaged from gear 83. Since member 80 is not at this stage subject to any torque from gear 83, the hairspring 91 exerts sufficient force to effect rotation of actuating gear 80 back to its nonfunctioning position to thus produce a smooth surface 33 of spooling member 30 over which line L can easily slip.

The outer end of the drive shaft 29 is fitted with a control member or button 44 and the same is exposed through an opening 45 in a gear case 46 removably mounted upon the end plate 11 by screws. Such exposure of the control button 44 places it in a position for convenient operation by the operator's thumb or finger so that it may be pressed inwardly to project the drive shaft 29 and attached spooling member 30 toward the left as viewed in FIG. 5, such motion being yieldably opposed by an expansion coil spring 48 on the shaft and within the gear case. This movement of the drive shaft moves the attached spooling member 30 also to the left as seen in FIG. 5. The line L being positioned over the spooling member 30 is snubbed between the cover 14 and spooling member 30 and thus line L is prevented from being further removed from the spool. It is seen that such braking and limiting means has many advantages for both casting and "playing" a fish.

The drive shaft 29 is rotated for spooling line by a driven gear 50, slidably mounted upon the shaft within the gear case 46 and held against rotation by flats at opposite sides of said shaft. The gear 50 meshes with a larger drive gear 52 which is carried upon a crank shaft, designated generally at 53, adapted to be rotated by a crank 54 in the usual manner.

It is, of course, necessary to provide an adjustable, frictional resistance to outward travel of the line L and for this purpose I now provide a conventional star drag assembly mounted upon the axis of the crank shaft. The crank shaft is made up of an inner flanged sleeve 55 which is rotatably mounted upon a stud 56 secured to the end plate 11, as best seen in FIG. 6, and this sleeve extends loosely outward through an opening 57 in the gear case 46, with the exposed end threaded and formed with opposed flats to conventionally mount the inner end of the crank 54 by the usual cap nut 58. The drive gear 52 turns freely upon the sleeve 55 and on its inner surface is formed with an annular recess 59 in which there is mounted a friction washer 60 held in place by the flange 61 upon the sleeve. The drive gear 52 is engaged upon the opposite side by a cup-shaped friction washer 62. Both said washers are preferably made of a self-lubricating plastic-type material. Mounted upon the sleeve 55, and within the cup of this washer, there is a bowed spring washer 63. A star wheel 64 is then provided and is formed with an annular, tapped collar 65 screwed upon the sleeve 55 to enter the cup of the washer 62 and adjustably bear against the spring washer 63. Obviously the adjustment of the star wheel 64 will vary the tension of the spring washer 63 effective to bring pressure to bear upon the opposite sides of the drive gear 52 by the opposed friction washers 60 and 62. The washer 62 is constrained to rotate with the sleeve 55. Thus this drag or clutch assembly causes the crank 54 to drive the gears 52 and 50 but frictionally so that a sufficient tension placed upon the line L, to overcome the frictional resistance, will turn the spooling member 30 along with the drive shaft 29 and pull line from the spool 24. The star wheel 64 permits very convenient adjustment of the magnitude of the friction resisting this outward travel of the line and the assembly is further such that once such adjustment is made it is not likely to become disturbed, so that it is possible for the operator to safely set the drag to release line when the pull is somewhat below the tensile breaking strength of the line in use, as is of particular benefit in spin fishing with the very light lines often employed in this art.

The line spool 24 is stationary and may be conveniently held in such a position by the slight inward projection of the end 56a of the crank shaft mounting stud 56 within the end plate 11 and the corresponding provision in the ends 25 of the spool of openings 78 to engage the end 56a. Such openings 78 are provided in both ends of the reel spool 24 so that the said spool may be reversed as heretofore described.

It will be noted that the gear driven actuating system I have described has many advantages over previous cam driven systems. Gear actuation is positive without chance of slippage as is so prevalent in cam devices. Actuation is accomplished in a much smoother manner than has ever been done before with substantial reductions in wear.

It should be understood that suitable modifications in the actuating mechanism could be made for left-handed operation, such modifications involving merely relocating the stop 84 and reversing the actuating member 80 such that operation is accomplished in a mirror image of that hereinabove described. The particular reel structure shown should in no way limit the use of my device, but serves only to illustrate one embodiment of my device and operation therein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a spinning reel, a case having an end plate and a removable cover having a line guide, a tubular bearing stationarily secured to said plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, a gear mounted on said bearing, said gear rotatable upon said bearing above a threshold torque value, a gear driven pick-up member rotatably mounted upon said spooling member, said pick-up member connected with said gear through intermeshed gear teeth, said pick-up member having an elongated portion disposed such that rotation of said pick-up member effects exposure of said elongated portion through a slit in said spooling member.

2. In a spinning reel, a line pick-up system, said system comprising an actuating means, a substantially rotatable gear intermeshed with said actuating means, said actuating means comprising a substantially circular member, gear teeth disposed along the periphery of said member, a pick-up pin affixed to said circular member, said pin projecting past the circumference of the outermost portion of said gear teeth, a spooling member having an essentially circular planar disc, a flange disposed around the circumference of said disc, said flange positioned substantially perpendicular to said disc, means movably mounting said substantially circular member on said disc inwardly of said flange, said flange being slit throughout a prescribed distance, said slit of sufficient dimension to allow said pick-up pin to penetrate therethrough.

3. In a spinning reel, a line pick-up system, said system comprising an actuating means, a substantially rotatable gear operatively connected to said actuating means and a spooling member, said actuating means comprising a substantially circular member, gear teeth disposed along the periphery of said member, a pick-up pin affixed perpendicular to the radius of said circular member, said pin projecting past the circumference of the outermost portion of said gear teeth, said spooling member having an essentially circular planar disc, a flange disposed around the circumference of said disc, said flange positioned substantially perpendicular to said disc, said flange being slit through a prescribed distance, said slit of sufficient dimension to allow said pick-up pin to penetrate therethrough, said actuating means attached to said spooling member by an axle permanently bonded to the inner surface of said disc, said actuating means rotatable about said axle.

4. A line pick-up system as in claim 3, said actuating means maintained in a nonfunctional position by a spring affixed at one end to the inner surface of said spooling member and at the opposite end to said actuating means, such that when said pick-up pin is put in functional position, tension is increased throughout said spring; a stopping means to limit movement of said actuating member when in a nonfunctional position.

References Cited by the Examiner

UNITED STATES PATENTS

| 2,668,024 | 2/1954 | Campbell | 242—84.2 |
| 2,676,769 | 4/1954 | Sarah | 242—84.21 |
| 2,828,088 | 3/1958 | Denison et al. | 242—84.2 |
| 3,018,979 | 1/1962 | Clickner | 242—84.21 |

FOREIGN PATENTS 237,582  8/1945  Switzerland.

MERVIN STEIN, *Primary Examiner.*

RUSSELL C. MADER, *Examiner.*